United States Patent
Weiss et al.

(10) Patent No.: US 7,640,095 B2
(45) Date of Patent: Dec. 29, 2009

(54) METHOD AND DEVICE FOR CONTROLLING AN INTERNAL COMBUSTION ENGINE

(75) Inventors: Frank Weiss, Pentling/Grasslfing (DE); Hong Zhang, Tegernheim (DE)

(73) Assignee: Siemens Aktiengesellschaft, Munich (DE)

( * ) Notice: Subject to any disclaimer, the term of this patent is extended or adjusted under 35 U.S.C. 154(b) by 441 days.

(21) Appl. No.: 11/664,955

(22) PCT Filed: Sep. 15, 2005

(86) PCT No.: PCT/EP2005/054596

§ 371 (c)(1), (2), (4) Date: Apr. 6, 2007

(87) PCT Pub. No.: WO2006/037720

PCT Pub. Date: Apr. 13, 2006

(65) Prior Publication Data

US 2009/0204307 A1    Aug. 13, 2009

(30) Foreign Application Priority Data

Oct. 6, 2004   (DE) ................ 10 2004 048 704

(51) Int. Cl.
- F02D 41/14 (2006.01)
- G06F 19/00 (2006.01)
- F02D 13/02 (2006.01)
- F01L 1/34 (2006.01)

(52) U.S. Cl. .............. 701/109; 701/103; 123/90.15; 123/692

(58) Field of Classification Search .......... 123/90.11, 123/90.15–90.18, 350, 478, 480, 492, 691, 123/692; 701/101–105, 109–111, 115
See application file for complete search history.

(56) References Cited

U.S. PATENT DOCUMENTS 4,726,331 A * 2/1988 Oyaizu .............. 123/90.15

(Continued)

FOREIGN PATENT DOCUMENTS

DE    102 20 141 A1    12/2003

(Continued)

*Primary Examiner*—Willis R Wolfe, Jr.
(74) *Attorney, Agent, or Firm*—King & Spalding L.L.P.

(57) ABSTRACT

Disclosed is an internal combustion engine comprising a first and a second cylinder line, each of which is provided with a camshaft for the gas intake valves and the gas discharge valves as well as a mechanism for adjusting a valve overlap between the gas intake valves and the gas discharge vales. A lambda controller whose manipulated variable acts upon an actuator that is allocated to the respective cylinder line is associated with each cylinder line. Values of the manipulated controller variables are detected as non-valve-overlapping values of the two cylinder lines in an operating situation in which the valve overlap is so small that the same does not influence the manipulated controller variables while values of the manipulated controller variables are detected as valve-overlapping values of the two cylinder lines in another operating situation in which the valve overlap is so great that the same influences the manipulated controller variables. A corrective value is determined for the adjusting mechanism assigned to the first cylinder line and/or a corrective value is determined for the adjusting mechanism assigned to the second cylinder line in accordance with the valve-overlapping values and non-valve-overlapping values of the two cylinder lines. The adjusting mechanisms of the two cylinder lines are triggered according to the corrective values assigned thereto.

15 Claims, 4 Drawing Sheets

U.S. PATENT DOCUMENTS

| | | | |
|---|---|---|---|
| 4,967,711 A * | 11/1990 | Morikawa | 123/478 |
| 5,152,262 A * | 10/1992 | Parker | 123/90.17 |
| 6,178,934 B1 * | 1/2001 | Hirasawa et al. | 123/90.11 |
| 6,837,231 B1 * | 1/2005 | Herrin | 123/692 |
| 6,877,466 B2 * | 4/2005 | Shindou et al. | 123/90.16 |
| 6,895,911 B2 * | 5/2005 | Schnaubelt et al. | 123/90.15 |
| 6,999,864 B2 * | 2/2006 | Iizuka et al. | 701/103 |
| 7,032,581 B2 * | 4/2006 | Gibson et al. | 123/673 |
| 7,069,909 B2 * | 7/2006 | Pozar et al. | 123/90.15 |

FOREIGN PATENT DOCUMENTS

| | | |
|---|---|---|
| EP | 1 167 703 A2 | 1/2002 |
| EP | 1 270 915 A2 | 1/2003 |
| EP | 1 312 773 A2 | 5/2003 |

\* cited by examiner

METHOD AND DEVICE FOR CONTROLLING AN INTERNAL COMBUSTION ENGINE

CROSS REFERENCE TO RELATED APPLICATIONS

This application is a U.S. National Stage Application of International Application No. PCT/EP2005/054596, filed Sep. 15, 2005, which designates the United States of America, and claims priority to German Application No. 10 2004 048 704.9 filed Oct. 6, 2004, the contents of which are hereby incorporated by reference in their entirety

FIELD OF INVENTION

The invention relates to a method and device for controlling an internal combustion engine.

BACKGROUND OF INVENTION

The performance and efficiency requirements for internal combustion engines are becoming increasingly stringent. At the same time, strict statutory provisions require pollutant emissions to be kept low. To this end it is known that internal combustion engines can be provided with adjustment facilities to set a valve overlap between the gas intake valves and gas discharge valves. It is thus possible to increase the torque produced overall by the internal combustion engine and reduce emissions. A valve overlap is the angle range—expressed as the crankshaft angle or camshaft angle—during which both the respective gas intake valve and the respective gas discharge valve enable a corresponding intake or discharge of the cylinder.

Internal combustion engines are also known, with which the individual cylinders are disposed in two lines. Such internal combustion engines are also known as V-engines. With such V-engines three cylinders are for example disposed on one cylinder line and a further three cylinders on a further cylinder line. In addition to low-emission operation and the high level of torque, which should be produced by such internal combustion engines, it is also a challenge to configure such internal combustion engines in such a manner that user-friendly operation is possible.

SUMMARY OF INVENTION

An object of the invention is to create a method and device for controlling an internal combustion engine with two cylinder lines, each allowing user-friendly operation of the internal combustion engine.

The object is achieved by the features of the independent claims. Advantageous embodiments of the invention are characterized in the subclaims.

According to a first aspect the invention is characterized by a method and a corresponding device for controlling an internal combustion engine with a first and second cylinder line, each having one camshaft for gas intake valves and a further camshaft for gas discharge valves of the cylinders assigned to the respective cylinder line. The cylinder lines also each have an adjustment facility to set a valve overlap between the gas intake valves and gas discharge valves. A lambda controller, the manipulated controller variable of which acts on at least one actuator, which is assigned to the respective cylinder line, is assigned to each cylinder line. In at least one operating situation, in which the valve overlap is so small that it has no influence on the manipulated controller variables, values of the manipulated controller variables are detected as non-valve-overlap values of the first and second cylinder lines. In this context no influence means that the valve overlap has a negligible influence on the manipulated controller variables. In at least one further operating situation, in which the valve overlap is so great that it has an influence on the manipulated controller variables, values of the manipulated controller variables are detected as valve-overlap values of the first and second cylinder lines. In this context influence of the valve overlap on the manipulated controller variables means that an undesirably incorrect valve overlap has a relevant influence on the manipulated controller variable and therefore results in an undesirable change in the air mass in the respective cylinders of the respective cylinder line.

A correction value for the adjustment facility assigned to the first cylinder line is determined as a function of the valve-overlap values and non-valve-overlap values of the first and second cylinder lines. Additionally or alternatively a correction value is determined for the adjustment facility assigned to the second cylinder line, similarly as a function of the valve-overlap values and non-valve-overlap values of the first and second cylinder lines. The adjustment facilities of the first and/or second cylinder line are then activated as a function of the correction values assigned to them. The actuators are in particular the injection valves assigned to the respective cylinder line but the actuators can also be other actuators, such as a pulse charging valve.

The invention makes use of the knowledge that the adjustment facility, a generally present transmitter unit between the crankshaft of the internal combustion engine and the respective camshafts and generally present sensor systems for detecting the respective angles of the crankshafts or camshafts are subject to mounting tolerances, changes in their characteristics during operation of the internal combustion engine, etc. Such inaccuracies can be configured differently in respect of the first and second cylinder lines. This can result in different air masses in the cylinders of the first cylinder line on the one hand and the cylinders of the second cylinder line on the other hand. This in turn means that the torques, transmitted by the combustion of an air/fuel mixture in the respective cylinders to the crankshaft, can differ from cylinder line to cylinder line. This means that the internal combustion engine runs in a manner that is not smooth or user-friendly. According to the invention such inaccuracies are identified based on the manipulated controller variables of the respective lambda controllers. Taking account of values of the manipulated controller variables as non-valve-overlap values of the first and second cylinder lines in the operating situation, in which the valve overlap is so small that it has no influence on the manipulated controller variables, ensures that other influencing variables, which impact on the manipulated controller variables, are compensated for and are therefore not ascribed incorrectly to inaccuracies in the area of the actual setting of the valve overlap. The correction value(s) can then be determined in an appropriate manner such that alignment of the valve overlap actually set by way of the cylinders of the first cylinder bank and the second cylinder bank takes place and the air masses flowing into the respective cylinders are therefore also aligned. This results in a high level of torque uniformity between the cylinder lines and thus to very user-friendly running of the internal combustion engine. The manipulated controller variables of the respective lambda controllers are also thus used. Such internal combustion engines, when operated with petrol, are generally fitted with lambda controllers. The manipulated controller variables are therefore available anyway as calculation variables in a corresponding device for controlling the internal combustion engine.

According to a second aspect, the invention is characterized by a method and a corresponding device for controlling an internal combustion engine with a first and second cylinder line, each having one camshaft for the gas intake valves and one for the gas discharge valves of the cylinders assigned to the respective cylinder line. The first and second cylinder lines also each have an adjustment facility to set a valve overlap between the gas intake valves and gas discharge valves. In contrast to the first aspect of the invention, in at least one operating situation, in which the valve overlap is so small that it has no influence on the torque, which is transmitted by the combustion of the air/fuel mixture in the cylinders to the crankshaft, values of a variable, which is representative of the torque generated by the first cylinder line and on the other hand by the second cylinder line, are detected as non-valve-overlap values of the first and second cylinder lines. Also in at least one further operating situation, in which the valve overlap is so great that it has an influence on the torque, which is transmitted by the combustion of the air/fuel mixture in the cylinders to the crankshaft, values of the variables, which are representative of the torque generated by the first cylinder line and on the other hand by the second cylinder line, are detected as valve-overlap values of the first and second cylinder lines. It is also thus possible to equalize the torques generated by the respective cylinder lines in a simple manner.

In an advantageous embodiment of the invention, detection of the non-valve-overlap values and valve-overlap values is started, when the manipulated controller variables of the first and second cylinder lines differ from each other by a predetermined lambda threshold value. It is thus possible to keep the computation outlay low overall, whilst still achieving good equalization of the torques produced by the respective cylinder lines over the operating life of the internal combustion engine with suitable selection of the lambda threshold value.

According to a further advantageous embodiment of the invention, detection of the valve-overlap values and non-valve-overlap values is started, when the values of the variable, which is representative of the torque generated by the first cylinder line and on the other hand by the second cylinder line, differ from each other by a predetermined torque threshold value. It is thus possible to keep the computation outlay low overall, whilst still achieving good equalization of the torques produced by the respective cylinder lines with suitable selection of the lambda threshold value.

According to a further advantageous embodiment of the invention the variable, which is representative of the torque generated by the first cylinder line and on the other hand by the second cylinder line, is selected as a rotational speed gradient. This has the advantage that it is simple to determine and the rotational speed is detected anyway for other control purposes.

According to a further advantageous embodiment of the invention, correction values are calculated as a function of mean valve-overlap values and non-valve-overlap values, which are averaged over a predetermined number of valve-overlap values or non-valve-overlap values or are valve-overlap values or non-valve-overlap values detected during a predetermined time period. This allows more accurate correction.

According to a further advantageous embodiment of the invention, correction of the activation of the adjustment facility or adjustment facilities takes place in an adaptive manner.

BRIEF DESCRIPTION OF THE DRAWINGS

Exemplary embodiments of the invention are described in more detail below with reference to the schematic drawings, in which.

Elements with the same structure or function are marked with the same reference characters in all the figures.

DETAILED DESCRIPTION OF INVENTION

An internal combustion engine (FIG. 1) has an intake tract 1, an engine block 2, a cylinder head 3 and an exhaust gas tract 4. The exhaust gas tract 1 preferably has at least one throttle valve 5, also at least one manifold 6 and an intake pipe 7, which leads to a cylinder Z1 via an intake duct into the engine block 2. The engine block 2 also has a crankshaft, which is coupled via a connecting rod 10 to the piston of the cylinder Z1.

Figure 1:
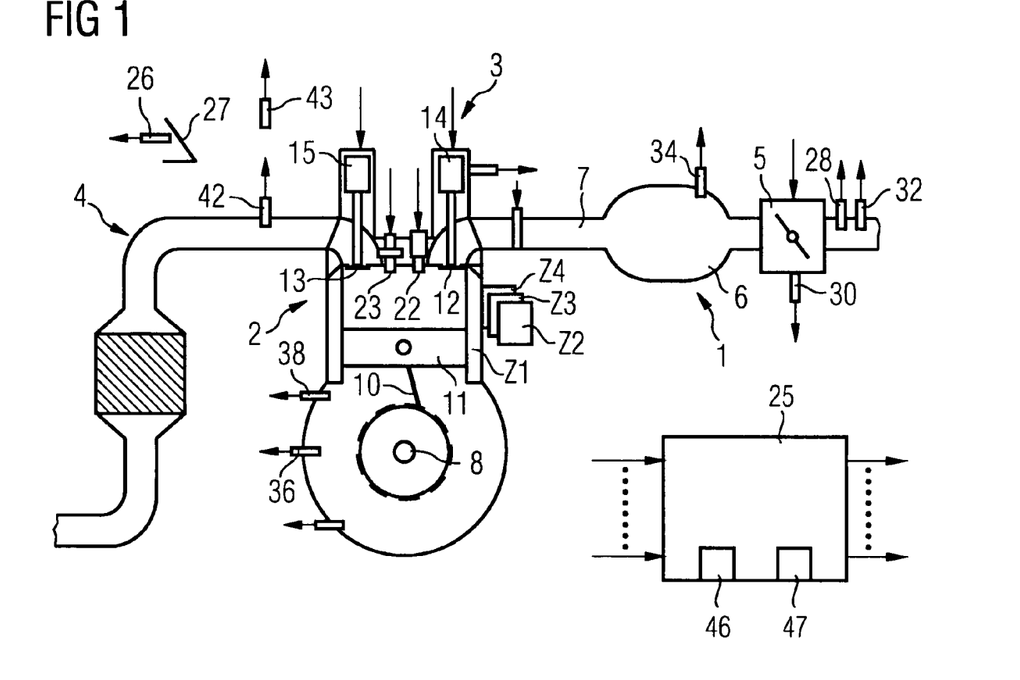
FIG. 1 shows an internal combustion engine with a control device.

The cylinder head 3 has a valve gear mechanism with a gas intake valve 12, a gas discharge valve 13 and valve drives 14, 15.

Figure 2:
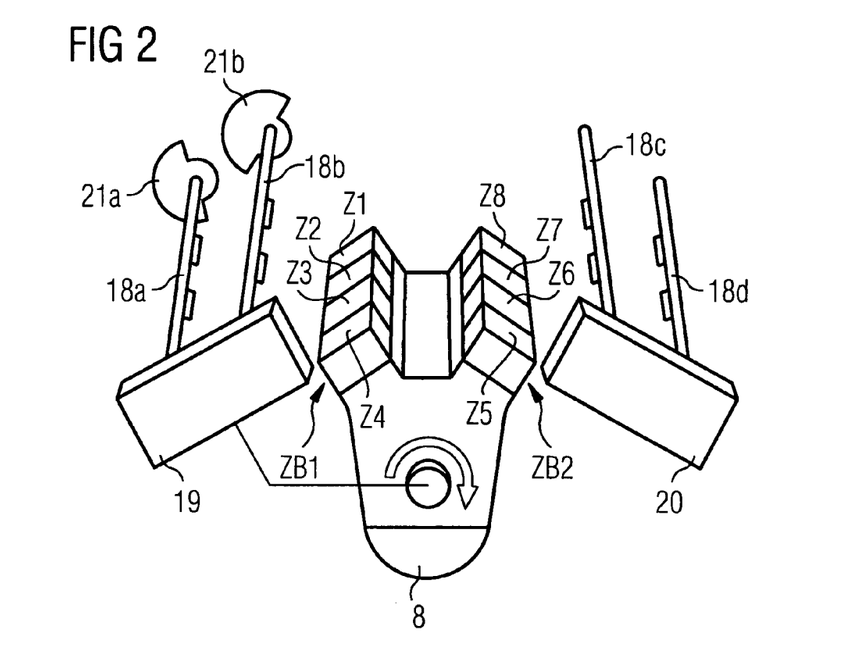
FIG. 2 shows a further view of parts of the internal combustion engine according to FIG. 1.

The internal combustion engine has a number of cylinders Z1 to Z8. The cylinders Z1 to Z4 are assigned to a first cylinder line ZB1, while cylinders Z5 to Z8 are assigned to a second cylinder line ZB2 (FIG. 2). A camshaft 18a is assigned to the gas intake valves 12 assigned to the cylinders Z1 to Z4 of the first cylinder line. A camshaft 18b is assigned to the gas discharge valves 13 assigned to the cylinders of the first cylinder line ZB1. The camshafts 18a and 18b are coupled mechanically to the crankshaft 8, with an adjustment facility 19 connected mechanically in between, being used to set a valve overlap VO between the camshafts 18a and 18b. To this end phase angles of either both or just one of the camshafts 18a and 18b are adjusted in relation to the crankshaft 8 by means of the adjustment facility.

Figure 3:
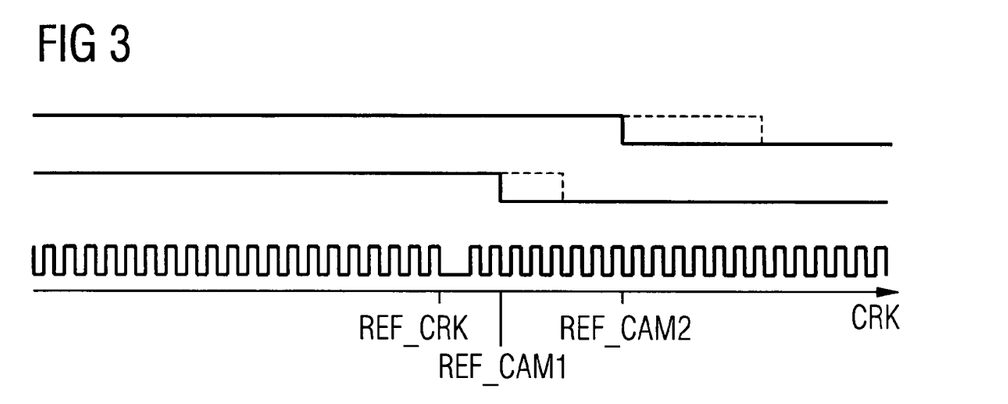
FIG. 3 shows signal patterns plotted over a crankshaft angle.

To clarify the concept of phase angle, FIG. 3 shows the pattern of a signal detected by means of a crankshaft angle sensor 36 plotted over the crankshaft angle CRK and by way of a comparison signals detected by corresponding camshaft angle sensors. The phase angle is defined by an angle, for example the crankshaft angle between two reference marks, one on the crankshaft and the other on the respective camshaft 18a, 18b, in relation to an absolute position of the camshaft or crankshaft. FIG. 3 shows this by way of example based on the reference mark REF_CRK and the reference mark REF_CAM 1 on the camshaft 18a or the reference mark REF_CAM2 on the camshaft 18b. The reference mark REF_CRK on the crankshaft 8 is defined by a falling tooth flank toward a gap in a toothed crankshaft angle sensor wheel. The reference mark REF_CAM1 and the reference mark REF_CAM2 of the camshaft 18a and 18b are respectively defined by corresponding tooth flanks of camshaft sensors 21a, 21b. An adjustment of the respective phase angle is shown in FIG. 3 with a broken line.

A camshaft 18c is assigned to the gas intake valves 12 of the cylinders Z5 to Z8 of the second cylinder line ZB2. A camshaft 18d is assigned to the gas discharge valves 13 of the cylinders Z5 to Z8 of the second cylinder line ZB2. The camshafts 18c and 18d are coupled mechanically to the crankshaft like the camshafts 18a and 18b and a valve overlap VO of the gas intake valves and the gas discharge valves 12, 13 of the cylinders Z5 to Z8 of the second cylinder line ZB2 can also be set here by means of an adjustment facility 20.

It is not necessary to be able to adjust the phase angle of both of the camshafts 18a to 18d assigned to a cylinder line ZB1, ZB2 in each instance. The valve overlap VO can also be set by means of just one adjustable camshaft 18a to 18d in each instance.

The cylinder head 3 also comprises an injection valve 22 and a spark plug 23. Alternatively the injection valve 22 can be disposed in the intake pipe 7.

A control device 25 is provided, to which sensors are assigned, which detect different measured variables and in each instance determine the value of the measured variable. The control device 25 determines manipulated variables as a function of at least one measured variable and these manipulated variables are then converted to one or more actuating signals to control the actuators by means of corresponding actuating drives. The control device 25 can also be referred to as a device for controlling the internal combustion engine.

The sensors are a pedal position sensor 26, which detects the position of an accelerator pedal 27, an air mass sensor 28, which detects an air mass flow upstream of the throttle valve 5, at least one but preferably two throttle valve position sensors 30, which detect the opening angle of the respective throttle valve 5, a first temperature sensor 32, which detects an intake air temperature, at least one intake pipe pressure sensor 34, which detects an intake pipe pressure in the manifold 6, a crankshaft angle sensor 36, which detects the crankshaft angle CRK, to which a rotational speed N is then also assigned. A second temperature sensor 38 detects a coolant temperature. At least one camshaft angle sensor 39 is also provided, which detects a camshaft angle. However a number of camshaft angle sensors can also be present, it being possible in some instances to assign a camshaft angle sensor to each camshaft. An exhaust gas probe 42, 43 is also assigned to each cylinder line ZB1, ZB2, to detect the residual oxygen content of the exhaust gas, its measurement signals being characteristic of the air/fuel ratio in the cylinders Z1 to Z4 of the first cylinder line ZB1 or in the cylinders Z5 to Z8 of the second cylinder line ZB2.

Any sub-set of the said sensors or even additional sensors can be present, depending on the embodiment of the invention.

Actuators are for example the throttle valve, the gas intake and gas discharge valves, a pulse charging valve, a valve lift adjustment facility, the injection valve 22 or the spark plug 23. Corresponding actuators are also assigned to the cylinders Z2 to Z8. The description of the cylinder Z1 is simply by way of example for all the cylinders Z1 to Z8.

A separate lambda controller 46, 47 is assigned to the control device for each cylinder line ZB1, ZB2. The lambda controller 46, 47 determines a respective manipulated controller variable LAM_FAC1, LAM_FAC2 as a function of the measurement signal of the respective exhaust gas probe 42, 43 and a setpoint value of the air/fuel ratio, said manipulated controller variable LAM_FAC1, LAM_FAC2 then being used for example to change the fuel mass to be metered to the cylinders either of the first cylinder line ZB1 or the second cylinder line ZB2 by way of the respective injection valves 22, to set the required setpoint value of the air/fuel ratio. The lambda controller 46, 47 can be configured for example as a PI or PII$^2$D controller or as another suitable controller 46, 47 known to the person skilled in the art.

A program for controlling the internal combustion engine in a first embodiment (see FIGS. 4 and 5) is stored in the control device 25 and can be executed during operation of the internal combustion engine. The program is started in a step S1.

Figure 4:
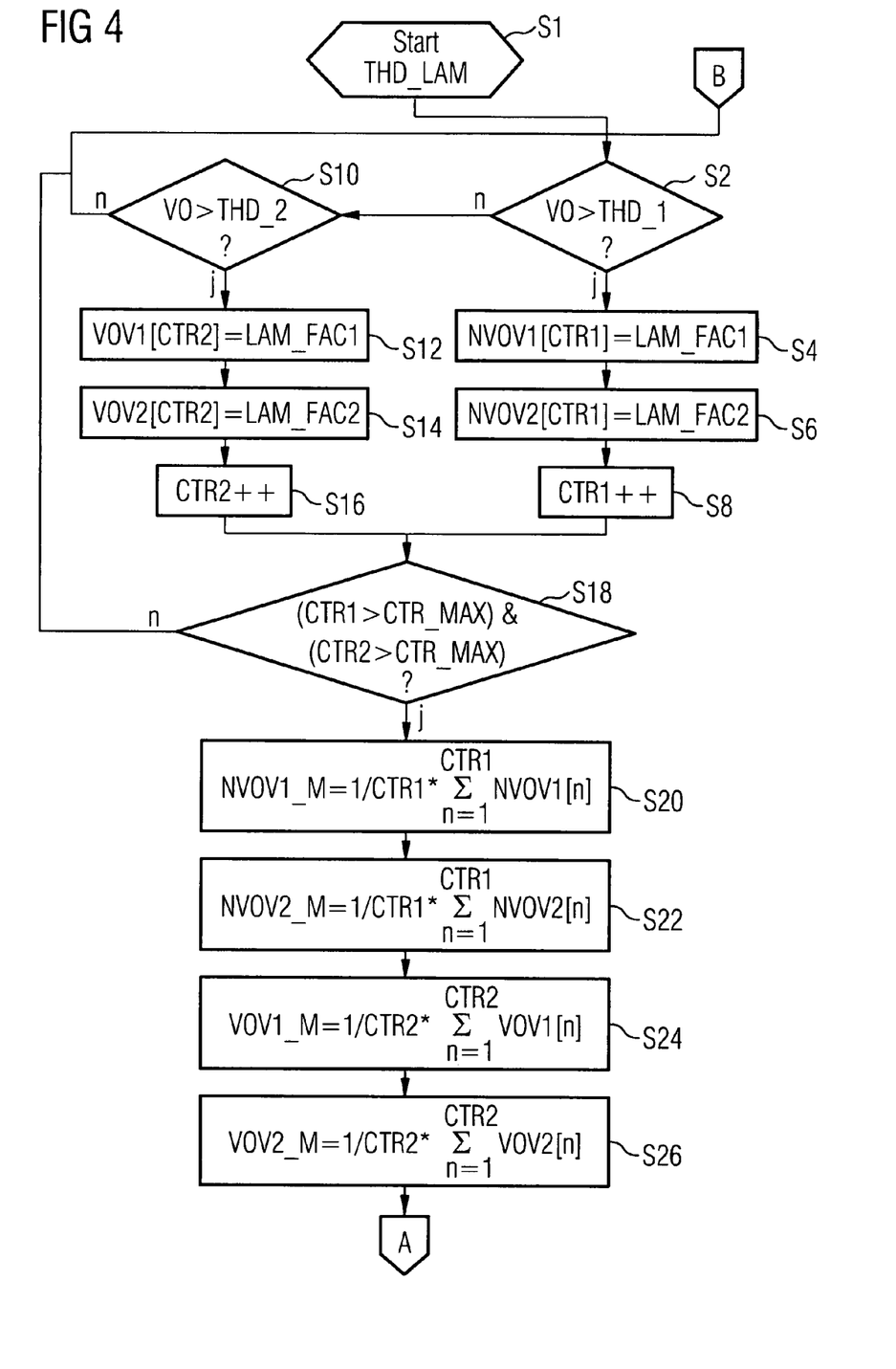
FIGS. 4 and 5 show a flow diagram of a first embodiment of a program for controlling an internal combustion engine and FIG. 6 shows a flow diagram of a further embodiment of a program for controlling the internal combustion engine.

The program is preferably started in step S1, when the difference between the manipulated controller variables LAM_FAC1, LAM_FAC2 is greater than an appropriately selected lambda threshold value THD_LAM. It is then verified in a step S2, whether the current valve overlap VO is greater than a predetermined first threshold value THD1. The valve overlap VO is preferably predetermined as identical for the cylinders Z1-Z8 of both cylinder lines ZB1, ZB2.

If the condition of step S2 is satisfied, in a step S4 the manipulated controller variable LAM_FAC1 is assigned to a first non-valve-overlap value NVOV1. A field is preferably assigned in the control device 25 to the first non-valve-overlap value NVOV1, which is assigned to the first cylinder line ZB1, so that a number of such first non-valve-overlap overlap values NVOV1 can be buffered. The first counter CTR1 given in square brackets designates the respective position within the vector.

In a subsequent step S6 the manipulated controller variable LAM_FAC2 is assigned to a second non-valve-overlap value NVOV2, which is assigned to the second cylinder line ZB2. A corresponding vector is provided here too, in order to be able to buffer a number of second non-valve-overlap values NVOV2, which are assigned to the second cylinder line ZB2.

The first counter CTR1 is incremented in a step S8.

If however the condition of step S2 is not satisfied, in a step S10 it is verified whether the valve overlap VO is greater than a second threshold value THD2. The first and second threshold values THD1, THD2 are predetermined in an appropriate manner and for example determined beforehand by means of corresponding tests. The first threshold value THD1 is selected such that, as long as the valve overlap VO is less than it, the valve overlap VO is so small that it has no or only a negligible influence on the manipulated controller variables, if it differs from the required valve overlap VO to be set. In contrast the second threshold value THD2 is selected such that when it is exceeded by the valve overlap VO, the valve overlap VO is so great that it has an influence on the manipulated controller variable LAM_FAC1, LAM_FAC2.

If the condition of step S10 is not satisfied, processing is resumed again in step S2, in some instances after a predetermined waiting period or a predetermined crankshaft angle. If however the condition of step S10 is satisfied, in a step S12 the value of the manipulated controller variable LAM_FAC1 is assigned to a first valve-overlap value VOV1. The first valve-overlap value VOV1 is thus assigned to the cylinders Z1 to Z4 of the first cylinder line ZB1. A vector is provided here too in the computation unit of the control device 25 or in a storage unit of said control device 25, to buffer a number of such values, and a counter CTR2 designates the storage location within the vector.

In a step S14 a second valve-overlap value VOV2 is assigned the current value of the manipulated controller variable LAM_FAC2. The second valve-overlap value VOV2 is thus assigned to the second cylinder line ZB2. A corresponding vector is provided here too, to buffer a number of values.

A counter CTR2 is then incremented in a subsequent step S14.

It is then verified in a step S18, whether both the first counter CTR1 and the second counter CTR2 exceed a maximum value CTR_MAX, which is predetermined in an appropriate manner. If not, processing is resumed in step S2, in some instances after the predetermined waiting period or after the predetermined crankshaft angle.

If however the condition of step S18 is satisfied, in a step S20 a mean first non-valve-overlap value NVOV1_M is determined according to the relationship set out in step S20. Mean second non-valve-overlap values NVOV2_M and first and second mean valve-overlap values VOV1_M, VOV2_M are determined correspondingly in the subsequent steps S22 to S26.

Figure 5:
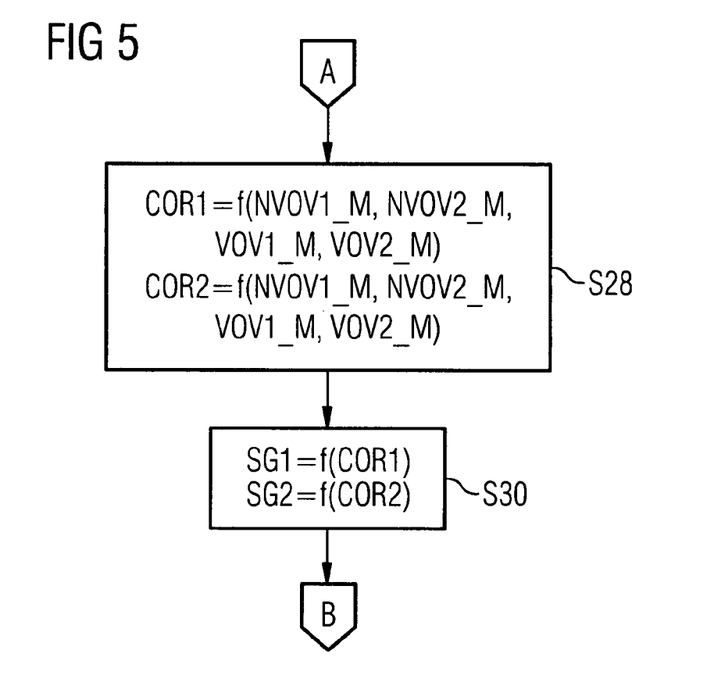

Processing then continues in a step following the logic point A. This is step S28, in which a first correction value COR1 and a second correction value COR2 are determined as a function of the mean first and second non-valve-overlap values NVOV1_M, NVOV2_M and the mean first and second valve-overlap values VOV1_M, VOV2M. This can be done for example by means of a predetermined analytical function or preferably by way of a characteristic field with appropriate data input. Such a characteristic field is for example determined beforehand by means of tests on an engine test bed or simulations and stored in the control device 25.

In a step S30 actuating signals SG1, SG2 to control the adjustment facilities 19, 20 are corrected as a function of the first or second correction values COR1, COR2, to align the air masses in the respective cylinders for a set valve overlap VO. Alternatively only one of the correction values COR1, COR2 may be determined, and therefore only the corresponding actuating signal SG1 or SG2 is corrected, similarly to align the air masses in the respective cylinders of the first and second cylinder lines.

The program is then either terminated or in some instances alternatively also resumed in step S2. The first or second correction value COR1, COR2 is preferably also adjusted in an adaptive manner.

Figure 6:
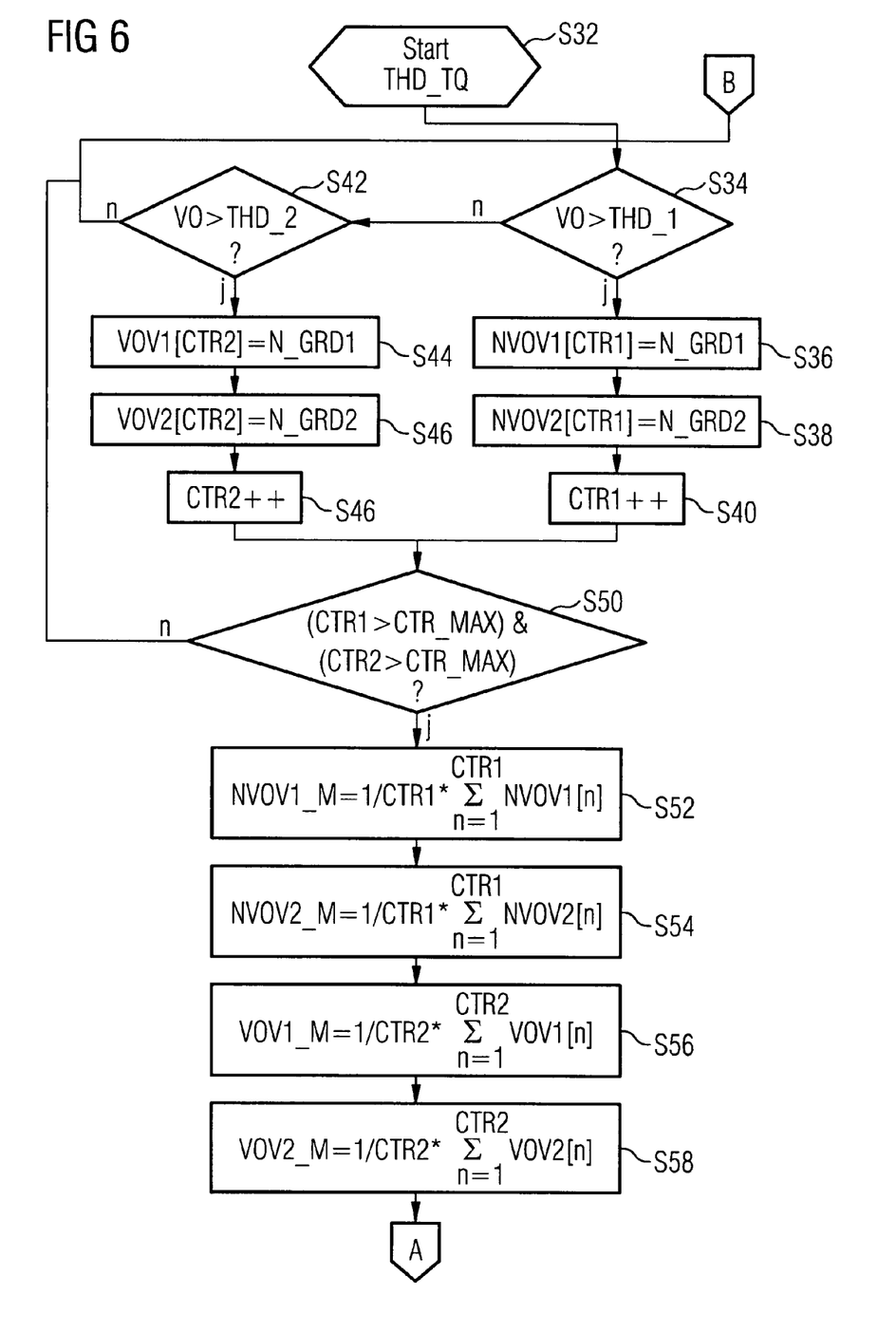

A second embodiment of the program is described in more detail with reference to the flow diagram in FIG. 6. The program is started in a step S32.

The program is preferably started in step S32, when the values of a variable, which is representative of the torque generated by the first cylinder line ZB1 and on the other hand by the second cylinder line ZB2, differ from each other by a predetermined torque threshold value THD_TQ. Such a variable can be a rotational speed gradient for example or even a detected torque.

Steps S34 to S58 then correspond analogously to steps S2 to S26. N_GRD1 are rotational speed gradients, which are assigned to the cylinders Z1-Z4 of the first cylinder line ZB1. N_GRD2 are rotational speed gradients, which are assigned to the cylinders Z5-Z8 of the second cylinder line ZB2.

The invention claimed is:

1. System for controlling an internal combustion engine comprising:
   a first cylinder line and a second cylinder line, each having a first camshaft for the gas intake valves and a second camshaft for the gas discharge valves of cylinders assigned to the respective cylinder line;
   an adjustment device to set a valve overlap between the gas intake valves and the gas discharge valves, wherein the adjustment devices are assigned to the first cylinder line and the second cylinder line;
   an actor assigned to at least one of the cylinder lines;
   a lambda controller assigned to each cylinder line, wherein a controller variable acts on the actuator; and
   a detecting and control device effective to:
   detect values of a variable, which are based upon a torque generated by the first cylinder line and the the second cylinder line, as non-valve-overlap values of the first cylinder line and the second cylinder line in a first operation situation of the internal combustion engine, when the valve overlap is sufficient smaller so as to have no influence on the torque,
   detect values of a variable, which are based upon the torque generated by the first cylinder line and the the second cylinder line, as valve-overlap values of the first cylinder line and the second cylinder line in a second operation situation of the internal combustion engine, when the valve overlap is sufficient greater so as to have an influence on the torque,
   determine a correction value for the adjustment device assigned to the first cylinder line based upon the valve-overlap values and non-valve-overlap values of the first cylinder line;
   determine a further correction value for the adjustment device assigned to the second cylinder line based upon the valve-overlap values and non-valve-overlap values of the second cylinder line;
   activate the adjustment device of the first cylinder line based upon the assigned correction values; and
   activate the adjustment device of the second cylinder line based upon the assigned correction values.

2. The system as claimed in claim 1, wherein the torque is transmitted by a combustion of an air/fuel mixture in the cylinders to a crankshaft.

3. The method as claimed in claim 2, wherein the detection of the valve-overlap values and non-valve-overlap values is started, when the values of the variable based upon the torque differ from each other by a predetermined torque threshold value.

4. A method for controlling an internal combustion engine comprising:
   providing a first and second cylinder line, each line having a first camshaft for the gas intake valves and a second camshaft for the gas discharge valves of cylinders assigned to the respective cylinder line, the first cylinder line and the second cylinder line having an adjustment device to set a valve overlap between the gas intake valves and the gas discharge valves;
   assigning an actor to at least one of the cylinder lines;
   assigning a lambda controller to each cylinder line, wherein a controller variable acts on the actuator;
   detecting values of the manipulated controller variables as non-valve-overlap values of the first cylinder line and the second cylinder line in a first operation situation of the internal combustion engine when the valve overlap is sufficient smaller so as to have no influence on the manipulated controller variables;
   detecting values of the manipulated controller variables as valve-overlap values of the first cylinder line and the second cylinder line in a second operation situation of the internal combustion engine when the valve overlap is sufficient greater so as to have an influence on the manipulated controller variables;
   determining a correction value for the adjustment device assigned to the first cylinder line based upon the valve-overlap values and non-valve-overlap values of the first cylinder line;

determining a further correction value for the adjustment device assigned to the second cylinder line based upon the valve-overlap values and non-valve-overlap values of the second cylinder line;

activating the adjustment device of the first cylinder line based upon the assigned correction values; and activating the adjustment device of the second cylinder line based upon the assigned correction values.

5. The method as claimed in claim 4, wherein the detection of the valve-overlap values and non-valve-overlap values is started, when the manipulated controller variables of the first cylinder line and the second cylinder line differ from each other by a predetermined lambda threshold value.

6. The method as claimed in claim 4, wherein the correction values are calculated based upon of mean valve-overlap values and mean non-valve-overlap values, which are averaged over a predetermined number of valve-overlap values and non-valve-overlap values.

7. The method as claimed in claim 4, wherein the correction values are calculated based upon of mean valve-overlap values and mean non-valve-overlap values, which are averaged over a predetermined time period.

8. The method as claimed in claim 4, wherein a correction of an activation of the adjustment device is performed adaptively.

9. A method for controlling an internal combustion engine comprising:

providing a first and second cylinder line, each line having a first camshaft for the gas intake valves and a second camshaft for the gas discharge valves of cylinders assigned to the respective cylinder line, the first cylinder line and the second cylinder line having an adjustment device to set a valve overlap between the gas intake valves and the gas discharge valves;

assigning an actor to at least one of the cylinder lines;

assigning a lambda controller to each cylinder line, wherein a controller variable acts on the actuator;

detecting values of a variable, which are based upon a torque generated by the first cylinder line and the the second cylinder line, as non-valve-overlap values of the first cylinder line and the second cylinder line in a first operation situation of the internal combustion engine, when the valve overlap is sufficient smaller so as to have no influence on the torque;

detecting values of a variable, which are based upon the torque generated by the first cylinder line and the the second cylinder line, as valve-overlap values of the first cylinder line and the second cylinder line in a second operation situation of the internal combustion engine, when the valve overlap is sufficient greater so as to have an influence on the torque;

determining a correction value for the adjustment device assigned to the first cylinder line based upon the valve-overlap values and non-valve-overlap values of the first cylinder line;

determining a further correction value for the adjustment device assigned to the second cylinder line based upon the valve-overlap values and non-valve-overlap values of the second cylinder line;

activating the adjustment device of the first cylinder line based upon the assigned correction values; and activating the adjustment device of the second cylinder line based upon the assigned correction values.

10. The method as claimed in claim 9, wherein the torque is transmitted by a combustion of an air/fuel mixture in the cylinders to a crankshaft.

11. The method as claimed in claim 9, wherein the detection of the valve-overlap values and non-valve-overlap values is started, when the values of the variable based upon the torque differ from each other by a predetermined torque threshold value.

12. The method as claimed in one of claim 9, wherein the variable is a rotational engine speed gradient.

13. The method as claimed in claim 9, wherein the correction values are calculated based upon of mean valve-overlap values and mean non-valve-overlap values, which are averaged over a predetermined number of valve-overlap values and non-valve-overlap values.

14. The method as claimed in claim 9, wherein the correction values are calculated based upon of mean valve-overlap values and mean non-valve-overlap values, which are averaged over a predetermined time period.

15. The method as claimed in claim 9, wherein a correction of an activation of the adjustment device is performed adaptively.

* * * * *